United States Patent [19]

Kermoian

[11] 4,155,692
[45] May 22, 1979

[54] SHEAR MOLDING OF REINFORCED LATCH

[75] Inventor: Gary H. Kermoian, Whittier, Calif.

[73] Assignee: Dolco Packaging Corporation, Sherman Oaks, Calif.

[21] Appl. No.: 900,534

[22] Filed: Apr. 27, 1978

Related U.S. Application Data

[60] Division of Ser. No. 807,263, Jun. 16, 1977, Pat. No. 4,108,941, which is a continuation of Ser. No. 680,248, Apr. 26, 1976, abandoned.

[51] Int. Cl.² ............................................ B29C 17/14
[52] U.S. Cl. .................................. 425/292; 264/163; 425/302.1; 425/310
[58] Field of Search ............... 425/292, 302.1, 310; 264/163, 153

[56] References Cited

U.S. PATENT DOCUMENTS

| | | | |
|---|---|---|---|
| 2,953,814 | 9/1960 | Mumford | 264/163 |
| 3,461,761 | 8/1969 | Mojonnier | 264/163 |
| 3,845,187 | 10/1974 | Dahlberg | 264/163 |
| 3,862,817 | 1/1975 | Dahlberg | 425/302.1 |
| 3,917,788 | 11/1975 | Padovani | 425/292 |
| 3,923,948 | 12/1975 | Jackson et al. | 264/153 |

Primary Examiner—William E. Schulz
Attorney, Agent, or Firm—Nilsson, Robbins, Dalgarn, Berliner, Carson & Wurst

[57] ABSTRACT

Containers are formed with latch openings and a reinforced region adjacent to each opening, molded in one operation from a softened sheet of organic polymer material. The latch opening is formed by vertical shearing of the sheet from a predetermined area of one of the mold dies during the closure of the molds. The sheared-off material is compressed against adjacent portions of the sheet to define a reinforced edge of the aperture. Accretion of sheet material adjacent the aperture region adds strength and rigidity to the container wall and eliminates removal of waste material separated during formation of the latch opening.

11 Claims, 11 Drawing Figures

SHEAR MOLDING OF REINFORCED LATCH

This is a division of application Ser. No. 801,263 filed June 16, 1977 now U.S. Pat. No. 4,108,941; which is a continuation of Ser. No. 680,248, Apr. 26, 1976, abandoned.

FIELD OF THE INVENTION

The field of art to which the invention pertains includes the field of plastic article shaping, more specifically as it relates to the formation of apertured molded containers and molds therefor.

BACKGROUND AND SUMMARY OF THE INVENTION

Molded plastic containers, more specifically, containers molded from expanded organic polymer material are available in numerous shapes as packaging material for a variety of articles such as eggs, take-out food, light bulbs, seedlings and other articles which one desires to protect against impact, temperature changes and other adverse environmental effects. A large proportion of the containers designed for such purposes are provided with closure means which must withstand rough and rapid handling, or repeated opening and closing. A simple and effective closure is obtained by providing a latch member extending outwardly from or adjacent one edge of one half of the container and which is insertable into a latch opening provided in the mating container half. The latch member may be in the form of a flat tab or round protuberance, or the like. The opening can be provided in the container and the latch member disposed on the lid, or vice versa.

In conventional molding, the operations required to form a latch opening do not lend themselves to the continuous formation of containers. In the usual method of forming a container of expanded polymer material, a wide, continuous sheet of the polymer material is heated to soften it for molding, and the sheet is advanced between the parts of a multi-cavity mold. The mold parts are pressed together to form the containers while they are cooled to fix the polymer material in its molded shape, whereupon the mold parts are separated and the process is repeated indefinitely.

While it is a simple matter to design the mold die surfaces so that a portion of the sheet material is punched out during mold formation to form latch openings, a vacuum cleaning system is required for such operation and is often inadequate for removing all waste material. Such material is often left over in the mold cavity and then is entrained in the outer surface of the next container molded in that cavity, marring that container in appearance by the presence of the waste material embedded in its surface. As a result, an inordinate number of rejects is experienced when attempts are made to form openings in the same operation that molds the container. Accordingly, a subsequent punching step is utilized. However, such a step necessitates feeding the molded container from the molding station to a punching station and registration with punching equipment that includes male and female dies actuated to punch out the openings at the desired location. The slugs of punched out material must then be vacuumed away and the containers fed to a cutting and trimming station for cutting, separation from the large sheets and stacking. The hole punching equipment adds appreciably to the cost and space required for the basic equipment. Precisely adjusted equipment is required for registering the containers accurately with the hole punching equipment so that the openings are properly spaced. Hole punching equipment causes many problems and a significant percentage of containers must be scrapped because of various malfunctions of this accessory. Similarly, the cutting and trimming station adds to the cost of the basic machinery and requires additional precision registration equipment.

A method described and claimed in U.S. Pat. No. 3,845,187 of Oct. 29, 1974 attempts to overcome the foregoing disadvantages by obliquely pressing a hole former through the sheet of plastic during the molding operation so as to provide an opening therein, and by scraping the detached material into a compressed wall adjacent the lower edge of the opening. In the process, the former is in contact with the die surface on which the sheet is being stretched as the molds close. However, there are limitations in such a method in the design of the mold components and in the range of utility of the apparatus. The requirement that the hole former be in contact with the die surface when it cuts through the plastic sheet necessitates frequent sharpening or replacement of the dulled or blunted cutting edge.

The present invention overcomes the disadvantages of prior art without the limitations of the aforementioned patent. Specifically, it provides molding equipment and a method enabling the ready formation of a container by combining the various steps of molding, latch opening forming, reinforcing and cutting, in a single operation.

The container to be molded is from a sheet of expanded organic polymer material, such as expanded polystyrene, and includes latch openings on mating halves which form part of the closure system. The container includes bottom and top parts which may be separate or may be integrally formed with a hinge connection. The parts may be identical or one part, usually the bottom, may be deeper, so that the mating part is considered a lid. Regardless of the function of a container part, the present invention is concerned only with providing an aperture, serving as a latch opening, through one or the other of the parts.

The aperture serving as a latch opening is formed by separating a portion of the sheet from an adjacent region. The separated portion is removed from the area of the opening and used to strengthen a predetermined region adjacent thereto, either by vertical build-up of the adjacent region or by providing a reinforced lip of extended surface. Shearing and removal of the sheared sheet is accomplished by the vertical movement of a shear bar past a vertically aligned die face during compression of the molds. The shear bar entrains the sheared-off sheet portion and moves it downwardly into a cavity of predetermined shape where it is compressed and thereby strengthens particularly vulnerable zones in the vicinity of the latch opening.

The mold utilized to provide the present structure includes male and female mold parts having their die surfaces in confronting relation and shaped to contour the surfaces of the sheet to form the container. The mold parts are spaced from one another a distance sufficient to permit the insertion of a sheet of organic polymer material between the die surfaces. The mold parts are formed with confronting regions for defining projections such as a latch tab or a latch protuberance or ledge at appropriate portions of the container wall. The container is cut and trimmed during the molding operation by means of male and female trim dies disposed on opposite sides of a stipper plate which serves to eject the finished container from the molding station.

A male shear insert which is releasably attached to the interior of the male mold includes a portion which protrudes therefrom through an opening provided in the region of the latch opening. The protruding portion has a vertically oriented flat end face which forms a backwall for a portion of the sheet deployed between the male and female mold parts. A vertically reciprocable female shear bar is attached to the female trim die and includes a flat surface portion which, during the downward travel of the mold, slides past the parallel flat face of the male shear insert at a distance which is less than the diameter of the sheet. Sheet portions which adhere to the vertical face of the stationary male shear insert are thus sheared off by the movable shear bar and carried along with it in a downward direction, to reinforce or build-up a region of the container adjacent the opening. The mold surfaces can be formed so that shearing results in a horizontal extension of the container material to form a reinforced lip, with or without vertical build-up, as will be illustrated in the first and third embodiments to be described in detail. In the second embodiment to be described, the vertical shearing results in a vertical build-up to enable the container to withstand repeated opening and closing operations.

DETAILED DESCRIPTION

As required, detailed illustrative embodiments of the invention are disclosed herein. However, it is to be understood that the embodiments merely exemplify the invention which may take forms that are different from the specific illustrated embodiments disclosed. Therefore, specific structural and functional details are not to be interpreted as necessarily limiting, but as a basis for the claims which define the scope of the invention.

Figure 1:
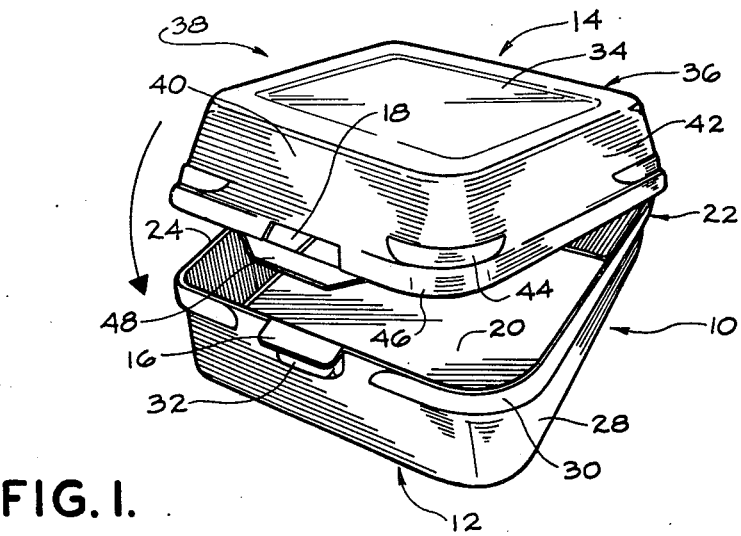
FIG. 1 is a perspective view of a reclosable food container with a hinged lid including a latch opening in accordance with the present invention.

Referring to FIG. 1, there is shown a one-piece semirigid food container 10 constructed to include two boxlike members 12 and 14, one of the members 12 serving as a receptacle and the other member 14 serving as a lid therefor. The receptacle 12, the lid 14 and a hinge (not shown) connecting the two parts are integrally molded as a unitary container. In the perspective view of FIG. 1, the lid 14 of the half-open container 10 is being moved in the direction of the arrow toward a closed position in which a latch tab 16 attached to the receptacle 12, will be inserted in a latch opening 18 provided in the lid.

The receptacle 12 includes a generally rectangular base wall 20 with rounded corners, and side walls 22, 24, 26 and 28 respectively, which extend outwardly from the base wall in a tapering direction. The upper portions of the walls 24 and 28, and parts of the upper portions of the walls 22 and 26 are reinforced by integrally molded convex trim bands 30. The latch tab 16 is disposed at the center of the wall 26 between proximate portions of the trim band 30 and extends horizontally outwardly therefrom. A projection 32 (better seen in FIG. 2) juts out from the wall 26 below the latch tab 16 and serves as a support for the latch tab as well as a stop limiting the distance by which the tab can be advanced through the latch opening 18 (FIG. 2).

The lid 14 includes a rectangular base wall 34 with rounded corners which is integrally molded with outwardly tapering side walls 36, 38, 40 and 42 respectively. The corners of the side walls are reinforced by integrally molded convex trim strips 44. An outwardly bulging flange 46 on the upper ends of the walls 38, 40 and 42 is integrally molded therewith. The latch opening 18 which lies in a vertical plane is formed at the center of the wall 40 in the region of the flange 46. A latch ledge 48 which extends horizontally outwards from the lower edge of the latch opening 18 is reinforced by accretion thereon of the material removed from the area of the latch opening.

Figure 2:
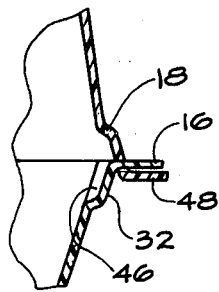
FIG. 2 is a fragmentary cross-sectional view of the latch closure of the container of FIG. 1.

Referring additionally to FIG. 2, in the closed position of the container 10 the latch tab 16 is in parallel alignment with the ledge 48 and is supported thereon. The sidewalls 38, 40 and 42 of the lid 14 overlap and envelop the upper portions of the receptacle walls 24, 26 and 28 by a distance defined by the depth of the flange 46 on the lid. The container 10 can be closed and opened by the application of manual pressure to a region below the projection 32 on the wall 26 which moves the latch tab 16 toward the interior of the container to facilitate engagement or disengagement with the latch opening 18.

Figure 3:
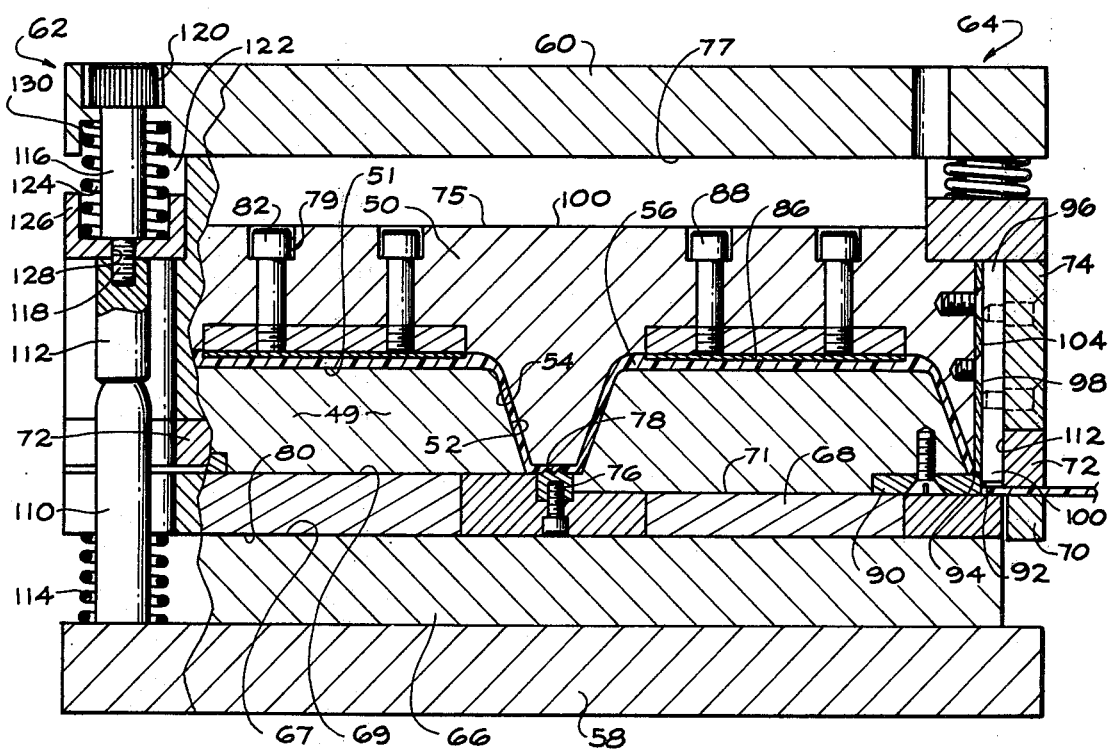
FIG. 3 is a cross-sectional view, partly cut away, of male and female mold parts and associated components of a molding station for forming the container of FIG. 1.

Referring now to FIG. 3, there is shown in cross-section a single molding station which is identical to a plurality of molding stations in tandem therewith in a direction into the drawing sheet, such as are conventionally arranged to form simultaneously a plurality of containers between the conforming surfaces of a bank of molds. The containers are molded from a sheet of organic polymer material, preferably of the expanded type, such as expanded polyethylene, expanded polypropylene or expanded polystyrene, depending in part on the kind of articles which are to be enclosed in the containers.

The molding station of FIG. 3 includes male and female mold parts 49 and 50, respectively, formed with confronting die surfaces 52 and 54, shaped to contour a sheet 56 of organic polymer inserted therebetween into the form of the container 10 shown in FIG. 1. In the embodiment of FIG. 3 the mold parts 49 and 50 and their die surfaces 52 and 54 define the contours of the receptacle 12 (shown upside down) side by side with the contours of the lid 14. The molds 49 and 50 are closed together during molding and are opened to permit ejection of the cooled finished container and the subsequent insertion of a new soft sheet material into the cavity defined by the die surfaces 52 and 54.

The mold parts are disposed in a housing formed of separate parts, portions of which are slidably nested in one another. At the bottom of the housing a male base plate 58 serves as the floor, and at the top a female base plate 60 forms the upper boundary. Two push rod assemblies 62 and 64, respectively, disposed at opposite sides of the housing and secured to the plates 58 and 60 thereat, define the lateral width of the housing.

An aluminum water jacket 66 is disposed on top of the male base plate 58 and is supplied with cooling water to reduce the temperature of the heated sheet 56. The water jacket 66 has a flat upper surface 67 supporting thereon a male trim die 68. The male mold part 49 is carried on top of the surfaces 69 and 71 of the male trim die 68 and itself is formed with flat upper surfaces 51. The male trim die 68 which defines the contours of the upper edges of the container walls is encompassed by an annular stripper plate 70. A female trim die 72 is formed as an annular frame and is supported spaced from corresponding annular portions of the stripper plate 70. A female spacer plate 74 is disposed on top of the female trim die 72 and has a hollow interior which is formed to slidably receive the female mold 50 therein. The female mold 50 has a flat upper surface 75 in parallel alignment with the flat lower surface 77 of the female base plate 60 on top of the mold housing.

A bar 76 is threadedly connected to the male trim die 68 at the center of the male mold 49 and is formed with a bevelled upper surface 78 on which is molded the hinge, connecting the receptacle 12 and the lid 14. The male trim die 68 is stepped at the center of the male mold 49 to form an upper surface 69 and an adjoining surface 71 at different elevations, corresponding to the different depths of the receptacle 12 and the lid 14 produced by addition of the flange 46 to the outer edges of the lid walls according to FIG. 1.

A pair of embossing plates 84 and 86 respectively, threadedly connected by bolts 88 to the interior of the female mold 50, engage the planar surface portions of the softened sheet 56 to form letters or designs therein, as desired.

A male shear insert 90, threadedly attached to a portion of the interior of the male mold 49, has an anterior end portion formed with a vertical flat surface 92 which is projected outwardly from the male mold through an opening 94 provided therein in the region of the latch opening. The flat surface 92 has the dimensions of the latch opening 18 of FIG. 1 and intercepts the oblique plane of the wall defined by the male mold die 52.

An elongated female shear bar 96 of rectilinear cross section is threadedly attached to the female trim die 72 and vertically reciprocable therewith along a path of travel which brings a flat surface portion 98 of the bar into confrontation with the vertical flat face 92 of the shear insert 90, and spaced therefrom by a distance which is less than the width of the sheet 56. The leading end portion 100 of the shear bar 98 serves as a die face, defining together with the corresponding male die surface 52 an area in which the material removed from the latch opening is to be deposited.

The surface 98 of the shear bar 96 is snapped into an undercut machined along a juxtaposed surface of a hold-down member 104. The member 104 which is formed as an elongated bar of rectilinear cross-section is threadedly attached to the female mold 50 in a downward pointing direction, parallel to the alignment of the shear bar 96. During the downward movement of the female mold 50 the lower end 106 of the member 104 is brought to bear against the sheet 56 overlying a horizontal ledge which is formed between the edge of the vertical surface 92 and the oblique plane of the wall defined by the mold die 52. In this position, the hold-down member 104 arrests the movement of the sheet, at least in the direction of the vertical surface 92 while the female shear bar 96 slides past the vertical surface 92. The juxtaposition of the member 104 with the female shear bar 96 prevents a displacement in the transverse direction and ensures the correct alignment of the end portion 106 of the hold down member 104 on the ledge 108.

It will be appreciated that the releasable mode of attachment provided for the male shear insert 90, the female shear bar 96 and the hold-down member 104 permits rapid interchangeability of these parts with corresponding elements for producing latch openings of different size or different location with respect to the container walls, or with different adjacent areas which need to be reinforced.

The operation of the molding station is actuated by pressure from a source (not shown) applied to the upper ends of the push rod assemblies 62 and 64, and which causes the female mold 50 to move downwardly to close with the male mold 49. The push rod assemblies are of conventional design; each of the assemblies includes a pair of elongated rods 110 and 112 respectively, which are vertically and coaxially disposed between the male and female base plates 58 and 60 at one side of the mold station. The rod 110 has an extension of reduced diameter which is pressfit into an aperture provided in the plate 58. A helical spring 114 surrounding the rod 110 is confined in the space between the upper surface of the plate 58 and the lower surface 80 of the male trim die 68. A bolt 116 is vertically disposed in the female base plate 60 and includes at its downwardly pointing end 118 a threaded extension of reduced diameter which is received in an internally threaded bore provided at one end of the rod 112. The bolt 116 is admitted into the plate 60 through a bore 120 provided at the outer surface thereof. The bore 120 communicates with a coaxial cylindrical channel 122 of increased diameter which extends downwardly through the female base plate 60. A cup-shaped chamber 124 of equal diameter as the channel 122 is disposed coaxially therewith in the upper portion of the spacer plate 74. The channel 122 and the chamber 124 serve to locate a bushing 126 with a central opening 128 for passage of the bolt end portion 118 therethrough. The bushing 126 is formed as a seat for a helical spring 130 which surrounds the bolt 116.

At the start of a molding operation the upper surface 79 of the female spacer plate 72 and the surface 75 of the female mold 50, nested inside the plate 74 abut against the lower surface 77 of the female base plate 60 raised sufficiently so that a softened sheet of organic polymer material can be admitted between the female mold and the male mold, in the direction of the drawing. Upon introduction of the sheet, pressure is applied to the upper ends of the bolts 116 which causes the associated components of the push rod assemblies 62 and 64 to be compressed against the force of the springs 114 and 130. Compression of the push rod assemblies forces the female spacer plate 74, the female mold 50 and the female trim die 72 to move downwardly until, in the final compression stage, the male and female mold die surfaces 52 and 54 face each other across a cavity of predetermined diameter which defines the diameter of the molded container walls.

The downward movement of the female mold 50 and of the female trim die 72 entrains the downward movement of the hold-down member 104 and of the female shear bar 96. While the end portion 106 of the hold-down member 104 presses against the sheet on the ledge 108, the female shear bar 96 slides past the vertical surface 92 of the male shear insert 90 and shears off the sheet adhering thereto in order to form an opening therethrough. The continued downward movement of the bar 96 carries the sheared off sheet portion away from the area of the opening and forces it into a cavity defined by the anterior end 100 of the bar and the opposite male die surface 52, where it is compressed into a homogenous and unitary structure of increased strength and rigidity. In the illustration of FIG. 3 the reinforced structure represents the latch ledge 48 of FIG. 1 which projects outwardly from the container wall and perpendicular to the plane of the latch opening.

The release of the pressure and the simultaneous expansion of the compressed springs 114 and 130 moves the female mold 50, the spacer plate 74, and the female trim die 72 upwards and away from the male mold 49. The molded container is cut away from the sheet by the stripper plate, as is known to the art, and ejected from the mold, whereupon the process is repeated with new sheet material supplied from a source.

Progressive phases in the formation of the latch opening 18 and the latch ledge 48 of FIG. 1 are illustrated in the detail views of FIGS. 4A-4D. Initially (FIG. 4A), the male and female mold parts 49 and 50 are retracted, and the sheet 56 has not yet been bent into any particular shape. In the next phase (FIG. 4B), the downward movement of the female mold 50 has forced a portion of the sheet to follow the contour of the outwardly tapering wall structure defined by the die surfaces 52 and 54, while the hold-down member 104, specifically its end portion 106, is in contact with the as yet unbent portion of the sheet, thereby securing the sheet.

Figure 4A:
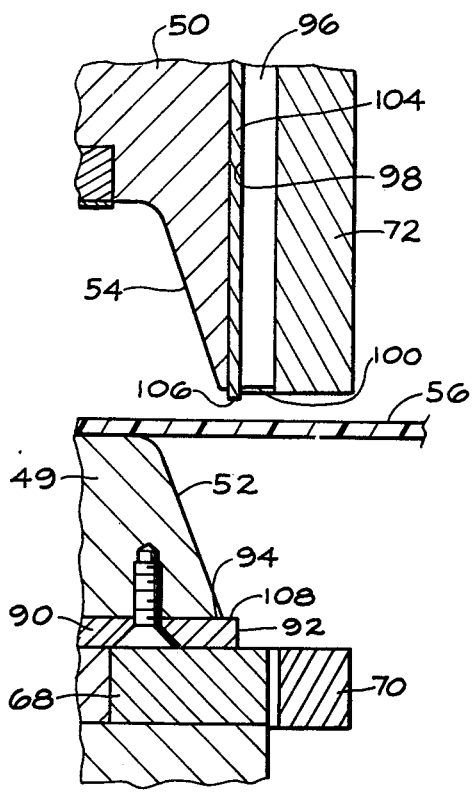
FIGS. 4–4D are shematic views showing four successive phases in the formation of the latch opening in accordance with the present invention.
Figure 4B:
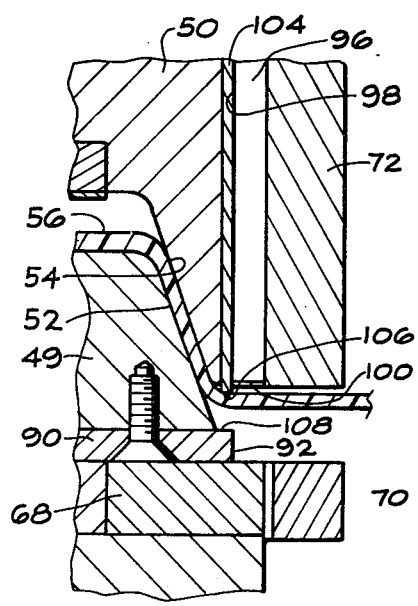
Figure 4C:
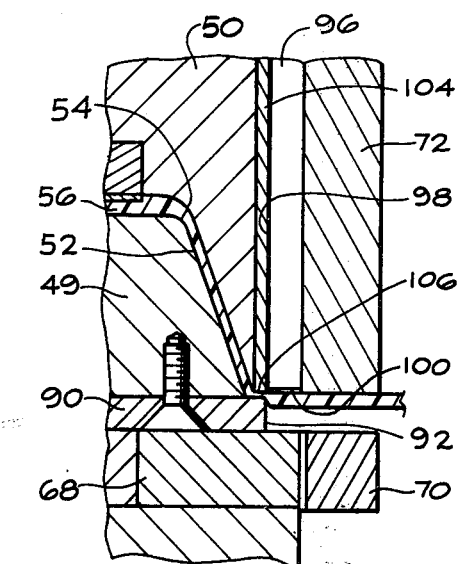
Figure 4D:
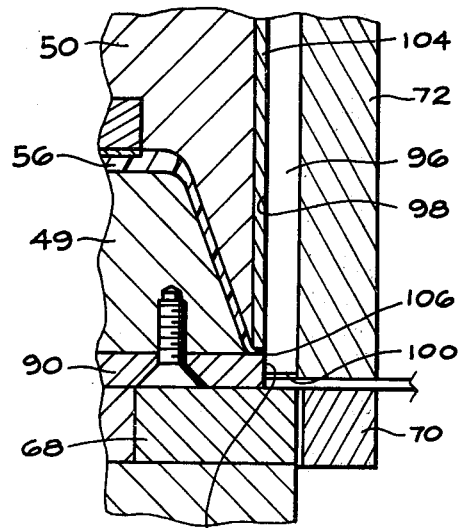

In the view shown in FIG. 4C, the female mold has moved closer toward the male mold 49, and the sheet has been deflected to lie against the ledge 108 by the further advancement of the hold-down member 104. The pressure on the sheet in this region has caused a forward portion thereof to move downwards across a part of the vertical surface 92 of the shear insert 90. At essentially the last stage (FIG. 4D), the female shear bar 96 has sheared past the surface 92, and the separated material has been pushed into the cavity between the recessed lower end 100 and the opposite male die surface 52.

The adaptability of the apparatus illustrated and described heretofore for the molding of containers of different contents is demonstrated in the embodiments shown in FIGS. 5-8.

Figure 5:
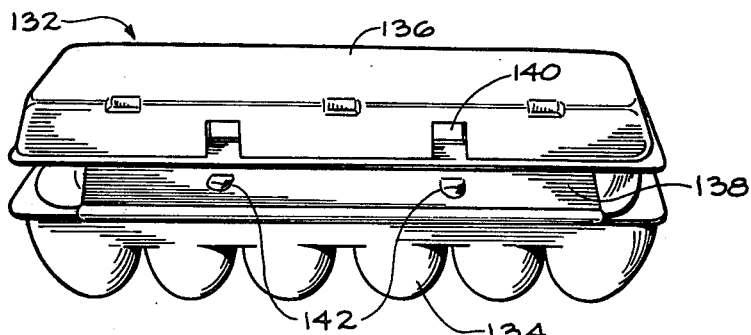
FIG. 5 is a perspective view of an egg carton with a hinged lid, including a latch opening, in accordance with the present invention.

In FIG. 5 there is illustrated an egg carton 132 which can hold a dozen eggs in a base 134, and whose cover 136, hinged to the base along one edge thereof (not shown), is closable over the base at the opposite edge for latching down over the eggs. The closing edge of the base 134 has a latch flap 138, and the cover 136 has a pair of latch openings 140 which interlock with studs 142 on the latch flap to close the cover.

Figure 6:
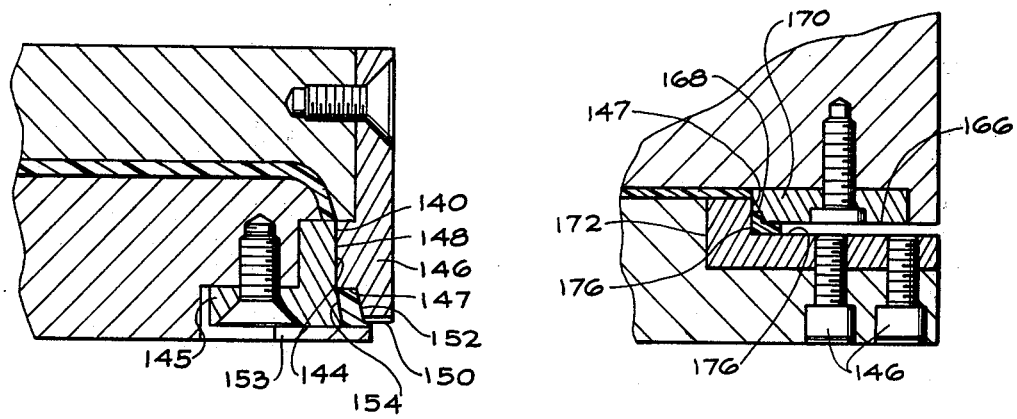
FIG. 6 is a fragmentary cross-sectional view of a part of the molding station for forming the container of FIG. 5.

The latch of an egg carton must withstand repeated openings and closings and therefore needs special reinforcement areas which are not necessarily identical with the reinforcement areas deemed important in other food containers, such as the one illustrated in FIG. 1. Accordingly, as shown in FIG. 6, the sheet material which has been removed during the latch forming process from the vertical wall 144 of the male shear insert 145 is utilized to strengthen a portion of the carton wall which is offset at an angle from the lower end of the latch opening 140. In the molded article this region is exposed to considerable pressure during the opening and closing motions. The cavity defining this region is thus defined on one side by vertically built-up material, providing a substantial degree of density and rigidity.

In the embodiment of FIG. 6, the female shear bar 146 has a shearing surface in the form of a boss 148 mounted thereon, and whose dimensions are identical with those of the flat surface 144 of the male shear insert 145. The surface of the female shear bar 146, between its lower end portion 150 and the boss 148, is formed as an oblique plane 152 which is parallel with a plane 154 joined at an angle to the male shear insert surface 144 at the lower edge of the latch opening. The cavity defined by the planes 152 and 154, by one side 147 of the boss 148 as the upper boundary, and a portion of the male die 153 as the lower boundary, represents a slanting wall portion between the lower edge of the latch opening and the outer edge of the container wall, in which the material separated from the latch opening is compressed to reinforce this region.

Figure 7:
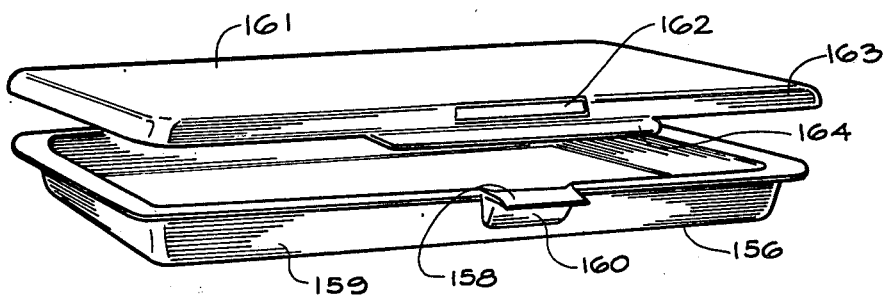
FIG. 7 is a perspective view of yet another type of container with a detached lid, including a latch opening, in accordance with the present invention.

FIG. 7 shows yet another food container comprising a shallow pan 156 with one latch tab 158 at the center of a front wall 159 and a projection 160 underneath, forming a support therefor. Additional latch tabs (not shown) are provided at the opposite wall. A separate lid 161, also of shallow depth, has a latch opening 162 in the form of an elongated slot in a front wall 163 at a position which corresponds to that of the latch tab 158 on the pan wall 159. Additional latch openings, corresponding to the latch tabs mentioned heretofore, are provided at the opposite wall (not shown) of the lid 161. A narrow latch ledge 164 projects horizontally outwardly from the wall 163 below the latch opening 162.

Figure 8:
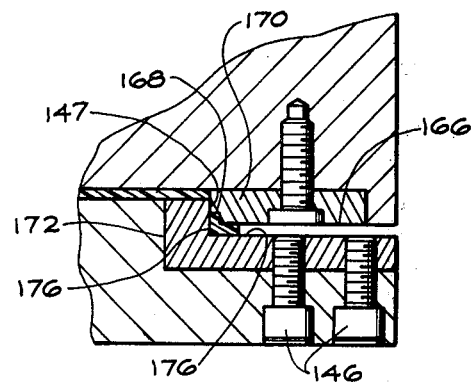
FIG. 8 is a fragmentary cross-sectional view of a part of the molding station for forming the container of FIG. 7.

In this type of container where latch tabs at opposite walls have to be fitted into corresponding latch openings, the latch ledges proximate the latch openings are subject to considerable bending stress and apt to break away. The area of reinforcement provided for this container has an L-shaped cross section and comprises two planes connected to one another at an angle of 90°, as shown in FIG. 8. In this embodiment, the female shear bar 166 includes a rectangular recess 168 in its proximal end portion 170. The male shear insert 172 comprises a vertical flat surface 174, an extension 176 coplanar therewith as an extension of the lower edge of the latch opening, and a flat horizontal surface 178, set off at an angle of 90° from the extension 176, and parallel with the end portion 170 of the female shear bar 166.

The invention described and illustrated is believed to admit of many modifications within the ability of persons skilled in the art, all such modifications being considered within the spirit and scope of the appended claims.

I claim:

1. A mold for forming in one operation a container with a latch opening and a reinforced area adjacent thereto from a softened sheet of organic polymer material, comprising male and female mold parts having male and female die surfaces respectively, in confronting relation and shaped to define the contours of the surfaces of said sheet to form said container, comprising:
- means for supporting said mold parts spaced from one another a distance sufficient to permit insertion of said sheet between said surfaces;
- means for closing said male and female mold parts toward one another to form said container;
- at least one vertically aligned flat surface disposed at the exterior of said male mold in the region of said latch opening and forming a backwall for the path of travel of said sheet;
- at least one shear member with a flat vertically aligned surface confrontable with said backwall, and an anterior end portion formed as a die face;
- means for moving said shear member in a downward confronting direction past said backwall at a distance less than the diameter of said sheet, to shear said sheet off said wall and to form an opening therethrough;
- means for carrying said sheared off sheet portion away from the lower edge of said opening and downwardly therefrom; and
- means for compressing said sheared off sheet portion in a region defined by said anterior end of said shear member and proximate die surfaces to add strength and rigidity to said area.

2. The mold of claim 1 in which said backwall has the dimensions of said latch opening.

3. The mold of claim 1 in which a trim die is releasably attached to said shear member, said trim die being vertically movable during closing of said male and female molds.

4. The mold of claim 1 in which said anterior end portion of said shear member is a flat surface.

5. The mold of claim 1 in which said anterior end portion of said shear member comprises a recess.

6. The mold of claim 1 in which said flat surface of said shear member includes a portion tapering off toward an anterior end of reduced cross section.

7. The mold of claim 1 in which said backwall is formed as the anterior end of a die inserted in said male mold through an opening provided therein and releasably attached at the interior thereof.

8. The mold of claim 1 in which said backwall is formed with an extension in the plane of said latch opening and extending downwardly from the lower edge thereof.

9. The mold of claim 1 in which said backwall is formed with an extension set off at an angle with respect to the plane of said latch opening and extending downwardly from the lower edge thereof.

10. The mold of claim 1 comprising means for securing said sheet at a location ahead of said backwall during said shearing movement of said shear member.

11. The mold of claim 10 in which said securing means comprises a vertically reciprocable member parallel with and adjacent to said shear member, releasably attached to said female mold part and movable therewith between a first position distal from said sheet and a second position bearing down on said sheet.

* * * * *